United States Patent
Chai et al.

(10) Patent No.: US 9,381,939 B2
(45) Date of Patent: Jul. 5, 2016

(54) VEHICLE STEERING CONTROL DEVICE AND VEHICLE STEERING CONTROL METHOD

(71) Applicant: NISSAN MOTOR CO., LTD., Yokohama-shi, Kanagawa (JP)

(72) Inventors: Yu wun Chai, Isehara (JP); Kazuhiro Igarashi, Ebina (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/768,283

(22) PCT Filed: Dec. 27, 2013

(86) PCT No.: PCT/JP2013/007706
§ 371 (c)(1),
(2) Date: Aug. 17, 2015

(87) PCT Pub. No.: WO2014/128818
PCT Pub. Date: Aug. 28, 2014

(65) Prior Publication Data
US 2015/0375780 A1 Dec. 31, 2015

(30) Foreign Application Priority Data

Feb. 21, 2013 (JP) ................................. 2013-031702

(51) Int. Cl.
*B62D 6/00* (2006.01)
*B62D 15/02* (2006.01)
(52) U.S. Cl.
CPC ................ *B62D 6/008* (2013.01); *B62D 6/002* (2013.01); *B62D 15/021* (2013.01)

(58) Field of Classification Search
CPC ....... B62D 6/008; B62D 15/021; B62D 6/002
USPC ...................................................... 701/41–44
See application file for complete search history.

(56) References Cited

U.S. PATENT DOCUMENTS 5,097,917 A * 3/1992 Serizawa ........... B62D 15/0225
180/402
6,079,513 A * 6/2000 Nishizaki ............... B62D 5/006
180/402

(Continued)

FOREIGN PATENT DOCUMENTS

JP 2002046639 A 2/2002
JP 2004314891 A 11/2004

(Continued)

*Primary Examiner* — Thomas Tarcza
*Assistant Examiner* — Tyler J Lee
(74) *Attorney, Agent, or Firm* — Young Basile Hanlon & MacFarlane, P.C.

(57) ABSTRACT

A vehicle steering control device and a vehicle steering control method achieve an ideal steering feeling. A turning controller is configured to set as a target turning angle of a turning wheel an addition value obtained by adding a steady steer control amount that is a control amount depending on a steering angle and a differential steer control amount that is a control amount depending on a steering angular velocity. In this situation, when a driver is increasingly turning a steering wheel, the differential steer control amount is computed to be smaller than the differential steer control amount when the driver is not increasingly turning the steering wheel. Accordingly, the phase of the turning angle with respect to the steering angle in the steering returning operation can be delayed as compared to the phase in the steering increasing operation.

6 Claims, 5 Drawing Sheets

(56) References Cited

U.S. PATENT DOCUMENTS

| | | | | |
|---|---|---|---|---|
| 6,138,788 | A * | 10/2000 | Bohner | B62D 5/006<br>180/402 |
| 6,213,248 | B1 * | 4/2001 | Kawaguchi | B62D 6/008<br>180/402 |
| 6,523,637 | B1 * | 2/2003 | Nakano | B62D 5/003<br>180/402 |
| 6,698,542 | B2 * | 3/2004 | Nishizaki | B60T 8/1755<br>180/402 |
| 6,983,816 | B2 * | 1/2006 | Takahashi | B62D 5/006<br>180/402 |
| 7,520,365 | B2 * | 4/2009 | Fukuba | B62D 6/008<br>180/402 |
| 7,594,563 | B2 * | 9/2009 | Lutz | B62D 5/005<br>180/402 |
| 7,832,522 | B2 * | 11/2010 | Akuta | B62D 6/002<br>180/400 |
| 8,352,125 | B2 * | 1/2013 | Gruener | B62D 6/008<br>701/41 |
| 2004/0238257 | A1 * | 12/2004 | Takahashi | B62D 5/006<br>180/402 |
| 2008/0185212 | A1 * | 8/2008 | Akuta | B62D 6/002<br>180/400 |
| 2012/0303218 | A1 * | 11/2012 | Tamura | B62D 1/02<br>701/41 |

FOREIGN PATENT DOCUMENTS

| | | |
|---|---|---|
| JP | 2008189200 A | 8/2008 |
| JP | 2011005933 A | 1/2011 |

* cited by examiner

VEHICLE STEERING CONTROL DEVICE AND VEHICLE STEERING CONTROL METHOD

CROSS REFERENCE TO RELATED APPLICATION

The entire contents of the Japanese Patent Application No. 2013-031702 (filed on Feb. 21, 2013) in which the priority right of the present patent application is claimed is herein incorporated by reference.

TECHNICAL FIELD

The present disclosure relates to a vehicle steering control device by use of Steer By Wire system in which an operation unit to be operated by a driver and a turning unit configured to turn turning wheels are mechanically separated from each other, and a vehicle steering control method.

BACKGROUND

In one technology, there is a steering control device that drive-controls a turning motor to turn the turning wheels to an angle (target turning angle) depending on the operation of the steering wheel, in a state where a torque transmission path between the steering wheel and the turning wheels is mechanically disconnected.

Such a steering control device is generally a device configuring a system (SBW system) called Steer By Wire (SBW), JP 2011-5933 A is given, as an example. In the SBW system, the target turning angles of the front wheels are calculated based on the steering angle of the steering wheel to control the turning motor, and in addition, a reaction force motor is controlled based on the target turning angles that have been calculated.

In the technology as disclosed in JP 2011-5933 A, in order to realize a target response in a steering increasing operation, when the phase of the turning angle with respect to the steering angle is advanced, an uncomfortable feeling is given to a driver in a steering returning operation by an excessive effect of the phase advance.

SUMMARY

Thus, it is an object of the present disclosure to provide a vehicle steering control device and a vehicle steering control method, by which an ideal steering feeling can be achieved.

In order to solve the above-described problem, in one embodiment of the present disclosure, in a case where a steering returning operation with the steering wheel operated by the driver is detected, the response performance of the turning output with respect to the steering input is made lower than the response performance in a case where a steering returning operation with the steering wheel operated by the driver is detected.

In some embodiments of the present disclosure, in the turning control, the turning response in the steering returning operation can be delayed as compared to the turning response in the steering increasing operation. Thus, it is possible to achieve an ideal steering feeling such that the response is not delayed in the steering increasing operation and the steering wheel naturally returns in the steering returning operation.

DETAILED DESCRIPTION OF THE EMBODIMENTS

Hereinafter, embodiments of the present disclosure will be described with reference to the attached drawings.

First Embodiment

Configuration

Figure 1:
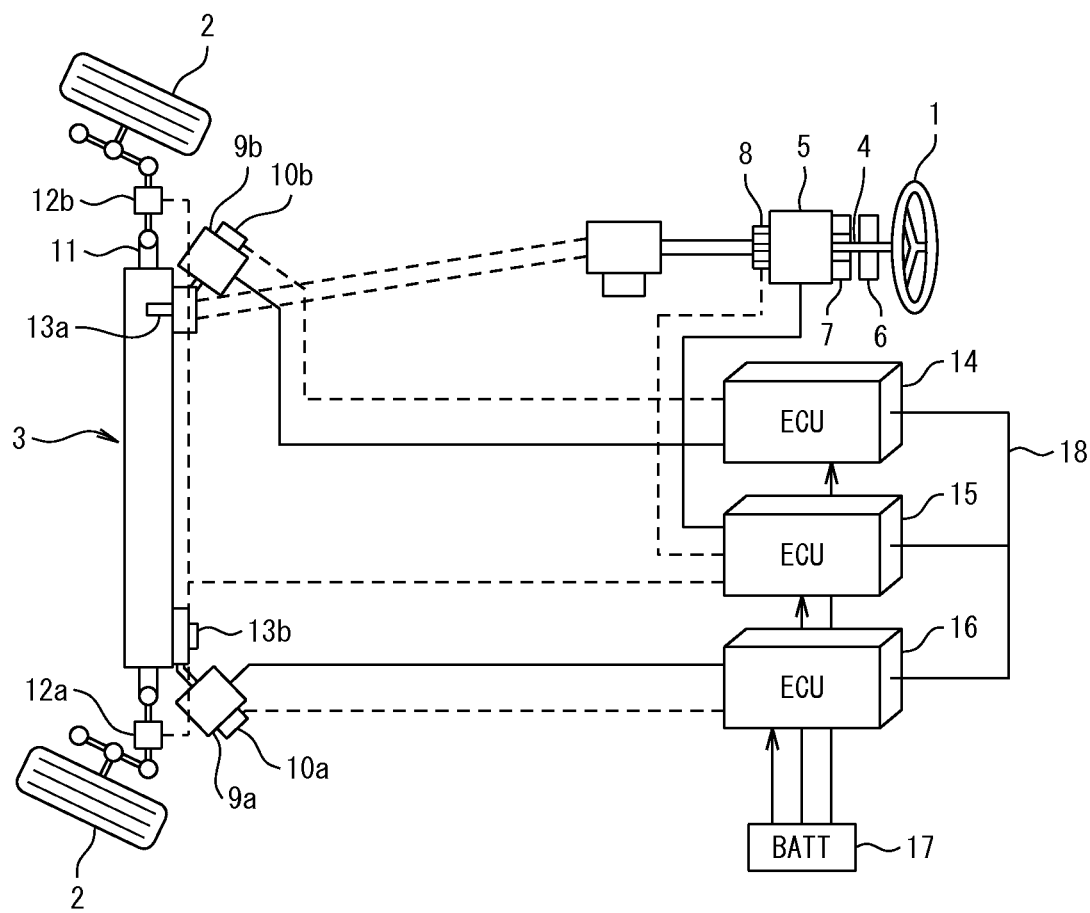
FIG. 1 is a view illustrative of a whole configuration of a vehicle including a vehicle steering device in one embodiment of the present disclosure.

FIG. 1 is a view illustrative of a whole configuration of a vehicle including a vehicle steering device in one embodiment of the present disclosure. The vehicle steering device is a so-called Steer By Wire (SBW) system in which a steering wheel 1 and a steering mechanism 3 configured to turn front wheels (turning wheels) 2 are mechanically separated from each other.

This vehicle includes a reaction force motor 5. The reaction force motor 5 is provided with a column shaft 4 configured to support the steering wheel 1. In addition, the vehicle includes a rotation angle sensor 6, a steering torque sensor 7, and a reaction force motor angle sensor 8. The rotation angle sensor 6 is configured to detect a rotation angle of the column shaft 4. The steering torque sensor 7 is configured to detect a steering torque from a twist angle of the column shaft 4. The reaction force motor angle sensor 8 is configured to detect a rotation angle of the reaction force motor 5.

Further, the vehicle includes first and second turning motors 9a and 9b. The first and second turning motors 9a and 9b are arranged at the steering mechanism 3, and apply turning torques to pinion gears 13a and 13b, respectively, to turn the front wheels 2.

Furthermore, the vehicle includes first and second turning motor angle sensors 10a and 10b, and first and second tire lateral force sensors 12a and 12b. The first and second turning motor angle sensors 10a and 10b are configured to detect rotation angles of the turning motors 9a and 9b, respectively, as turning angles that are the rotation angles from a straight travel state of the front wheels 2. The first and second tire lateral force sensors 12a and 12b are configured to detect forces to be input in an axial direction of a rack 11, respectively, from the front wheels 2 as the lateral forces of the front wheels 2. It is to be noted that the first turning motor 9a is mechanically coupled through the pinion gear 13a and the rack 11 to the front wheel 2, whereas the second turning motor 9b is mechanically coupled through the pinion gear 13b and the rack 11 to the front wheel 2. Therefore, the turning angles of the front wheels 2 can be detected by detecting the rotation angles of the first and second turning motors 9a and 9b.

First, second, and third controllers 14, 15, and 16 are configured to control the reaction force motor 5 and the first and second turning motors 9a and 9b.

The second controller 15 is configured to receive inputs of the rotation angle of the column shaft from the rotation angle sensor 6, a steering torque from the steering torque sensor 7, a reaction force motor angle from the reaction force motor angle sensor 8, and tire lateral forces from the first and second tire lateral force sensors 12a and 12b. In addition, the second controller 15 is configured to receive an input of vehicle information such as a wheel speed through a CAN communication line, not illustrated.

Then, the second controller 15 is configured to generate target turning angles of the front wheels 2 based on the reaction force motor angle from the reaction force motor angle sensor 8 and the vehicle speed from the CAN communication line, and to send them to the first and third controllers 14 and 16. The first controller 14 is configured to output to the first turning motor 9a an instruction electric current configured to eliminate a deviation between the target turning angle that has been input from the second controller 15 and an actual turning angle of the front wheel 2 that has been detected by the first turning motor angle sensor 10a, and to control the turning angle. The third controller 16 is configured to output to the second turning motor 9b an instruction electric current configured to eliminate a deviation between the target turning angle that has been input from the second controller 15 and the actual turning angle of the front wheel 2 that has been detected by the second turning motor angle sensor 10b, and to control the turning angle.

Further, the second controller 15 is configured to generate a target steering reaction force to be applied to the steering wheel 1 based on the reaction force motor angle from the reaction force motor angle sensor 8, the tire lateral forces from the first and second tire lateral force sensors 12a and 12b, electric current values of the first and second turning motors 9a and 9b, and the vehicle speed through the CAN communication line. Then, the second controller 15 is configured to output to the reaction force motor 5 an instruction electric current configured to eliminate a deviation between a target electric current based on the target steering reaction force that has been generated and the actual electric current that has been detected by an electric current sensor (not illustrated) that detects an electric current that is being supplied to the reaction force motor 5, and to control the steering reaction force.

The first, second, and third controllers 14, 15, and 16 are configured to supply the power from a battery 17. In addition, the first, second, and third controllers 14, 15, and 16 are configured to share input and output information one another through communication lines 18. Even if the second controller 15 has a failure, one of the remaining first and third controllers 14 and 16 is configured to generate the target turning angle and the target steering reaction force, so that the first and third controllers 14 and 16 can continuously control the first and second turning motors 9a and 9b and the reaction force motor 5.

The second controller 15 is configured to mechanically couple the column shaft 4 and the pinion shaft 13 with a backup clutch, for example, when both of the first and second turning motors 9a and 9b have failures or when the reaction force motor 5 has a failure. Accordingly, the manual steering by the driver is enabled.

It is to be noted that the second controller 15 is configured to set the rotation angle of the column shaft 4 to a neutral position (a position corresponding to a turning angle zero) based on the rotation angle of the column shaft detected by the rotation angle sensor 6 at the time of turning on the ignition.

Figure 2:
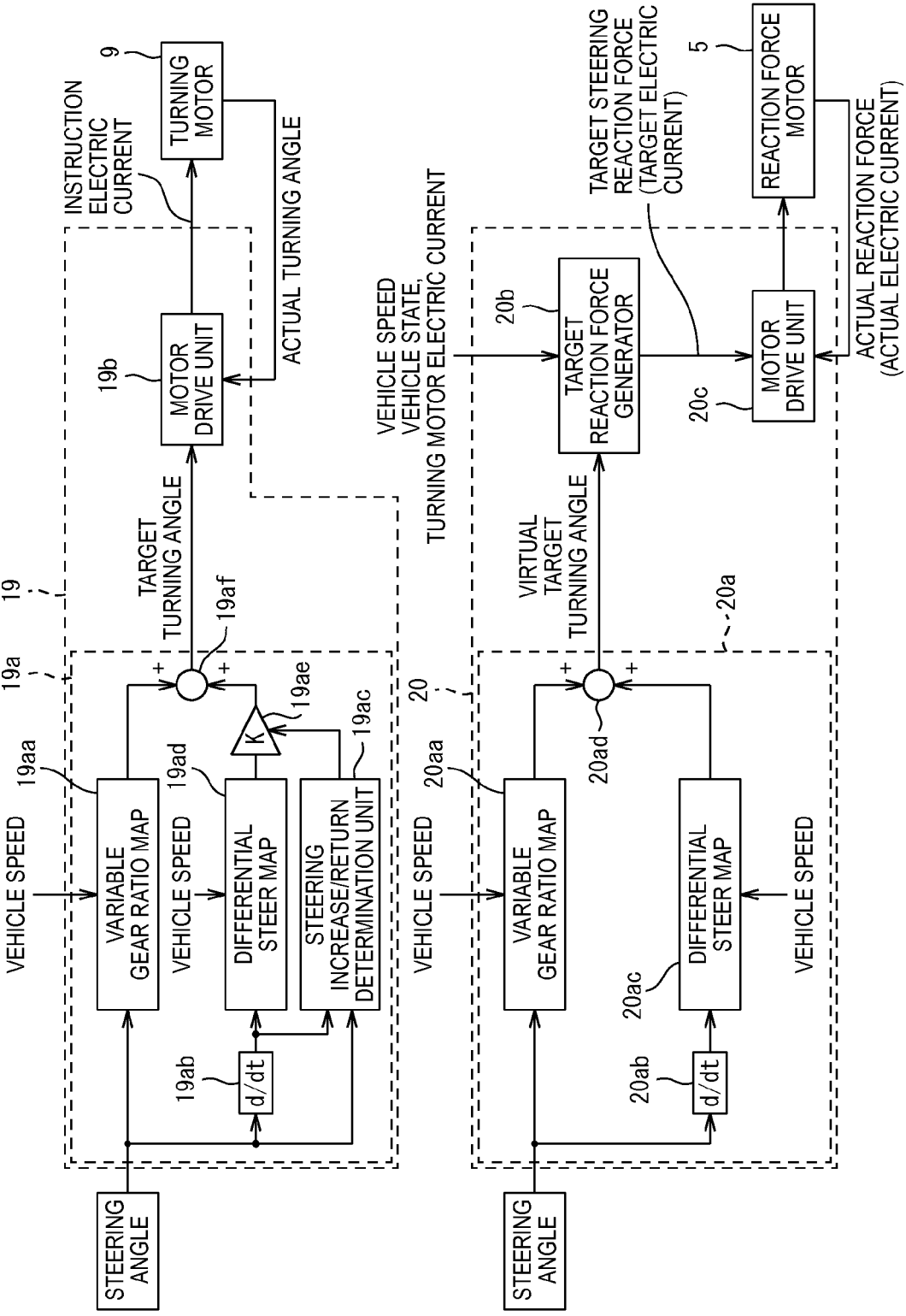
FIG. 2 is a control block diagram illustrative of turning control and reaction force control.

FIG. 2 is a control block diagram illustrative of turning control in one embodiment of the present disclosure.

Hereinafter, to simplify the description, the first and second turning motors 9a and 9b are referred to as turning motor 9, the first and second turning motor angle sensors 10a and 10b are referred to as turning motor angle sensor 10, and the first, second, and third controllers 14, 15, and 16 are referred to as controller 15, except for cases where the respective components have to be described individually.

The controller 15 includes a turning controller 19 and a steering reaction force controller 20.

The turning controller 19 includes a target turning angle generator 19a and a motor drive unit 19b.

The target turning angle generator 19a includes a steady steer control amount computation unit 19aa, a steering angular velocity computation unit 19ab, a steering increase/return determination unit 19ac, a differential steer control amount computation unit 19ad, a gain multiplication unit 19ae, and an addition unit 19af.

The steady steer control amount computation unit 19aa is configured to compute a steady steer control amount that is a control amount depending on the steering angle. The steady steer control amount is calculated by reference to a variable gear ratio map based on the steering angle that is an input angle to the steering wheel 1 operated by a driver and the vehicle speed.

The steering angle is estimated from the reaction force motor angle and the twist angle of a torsion bar arranged at the steering torque sensor 7. The twist angle of the torsion bar can be calculated from the twist characteristic of the torsion bar, by using the following relational expression.

Twist angle of torsion bar=steering torque/torque sensor spring constant.

Herein, the steering torque is a torque detected by the steering torque sensor 7. In addition, the torque sensor spring constant is a characteristic value of the torsion bar, and has become clear by experiments beforehand.

Therefore, the steering angle can be obtained by

Steering angle=twist angle of torsion bar+reaction force motor angle.

It is to be noted that the steering angle may be detected by use of the rotation angle of the steering wheel 1 that has been detected by the rotation angle sensor 6.

In the variable gear ratio map, the steady steer control amount is set from a relationship between the steering angle and the turning angle on the basis of the steering gear ratio (a ratio of the steering angle to the turning angle). The steering gear ratio is changed depending on the vehicle speed. For example, the steering gear ratio is small in a low vehicle speed region (the steering angle to the turning angle is made small) to improve the turning performance, whereas the steering gear ratio is large in a high vehicle speed region (the steering angle to the turning angle is made large) to improve the travel stability. In other words, the steering gear ratio depending on the vehicle speed is set based on the variable gear ratio map, so that the turning angle is set based on the gear ratio that has been set and the steering angle.

The steering angular velocity computation unit 19ab is configured to differentiate the steering angle to compute the steering angular velocity.

The steering increase/return determination unit 19ac is configured to determine whether the driver is increasingly turning the steering wheel 1 or returning the steering wheel 1 based on the steering angle and the steering angular velocity. Herein, when a code of the steering angle and a code of the steering angular velocity are same with each other, the steering increase/return determination unit 19ac is configured to determine that the driver is increasingly turning the steering wheel 1. When the code of the steering angle and the code of the steering angular velocity are different from each other, the steering increase/return determination unit 19ac is configured to determine that the driver is returning the steering wheel 1.

The differential steer control amount computation unit 19*ad* is configured to compute the differential steer control amount (reference value) that is a control amount depending on the steering angular velocity computed by the steering angular velocity computation unit 19*ab*. The differential steer control amount is calculated by reference to the differential steer map based on the steering angular velocity.

Figure 3:
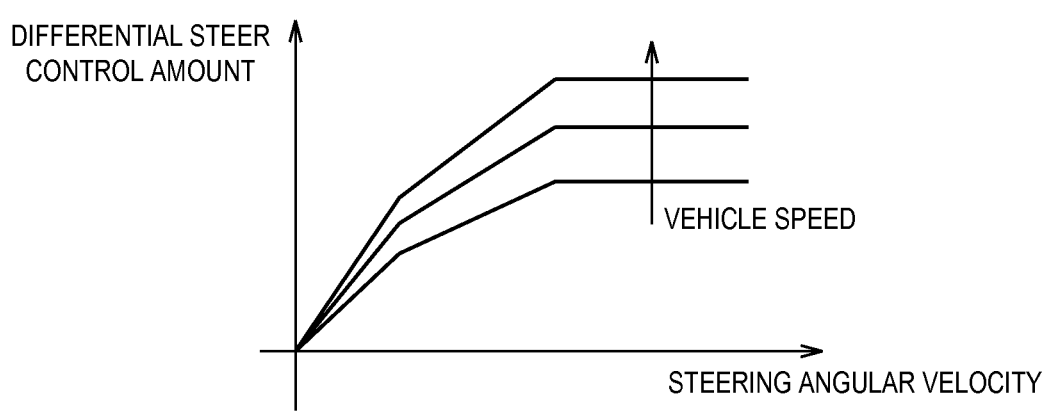
FIG. 3 is an example of a differential steer map.

FIG. 3 is an example of the differential steer map. The differential steer control amount in the turning control is set to be a value obtained by multiplying the steering angular velocity by a predefined differential gain K1. Here, in a range where the steering angular velocity is small, the differential gain K1 is set to be larger than that in a range where the steering angular velocity is large. In addition, the differential gain K1 is set to be larger, as the vehicle speed is higher. Further, the differential steer control amount is set to have an upper limit with a certain limit value.

The gain multiplication unit 19*ae* is configured to set a correction gain K according to a determination result of the steering increase/return determination unit 19*ac*, and to multiply the correction gain K by the differential steer control amount (reference value) computed by the differential steer control amount computation unit 19*ad*. The correction gain K is set to satisfy K=1, when the steering increase/return determination unit 19*ac* determines that a driver is increasingly turning the steering wheel 1. On the other hand, the correction gain K is set to be a predefined value satisfying K<1 (for example, 0.4), when the steering increase/return determination unit 19*ac* determines that a driver is returning the steering wheel 1.

The addition unit 19*af* is configured to add the steady steer control amount computed by the steady steer control amount computation unit 19*aa* and the corrected differential steer control amount that has been computed by the gain multiplication unit 19*ae*, and to generate the target turning angle.

Furthermore, the motor drive unit 19*b* is configured to supply to the turning motor 9 an instruction electric current by which the target turning angle generated by the target turning angle generator 19*a* and the actual turning angle (actual turning angle) match each other (in other words, the instruction electric current depending on a deviation between the target turning angle and the actual turning angle).

The steering reaction force controller 20 includes a virtual target turning angle generator 20*a*, a target reaction force generator 20*b*, and a motor drive unit 20*c*.

The virtual target turning angle generator 20*a* includes a steady steer control amount computation unit 20*aa*, a steering angular velocity computation unit 20*ab*, a differential steer control amount computation unit 20*ac*, and an addition unit 20*ad*.

The steady steer control amount computation unit 20*aa* is configured to compute a steady steer control amount that is a control amount depending on the steering angle. The steady steer control amount computation unit 20*aa* is configured to calculate the steady steer control amount by reference to the variable gear ratio map based on the steering angle that is an input angle to the steering wheel 1 operated by the driver and the vehicle speed. The variable gear ratio map is identical to the variable gear ratio map used by the steady steer control amount computation unit 19*aa* of the turning controller 19. In addition, the steering angle is calculated or detected in an identical method to that used by the steady steer control amount computation unit 19*aa* of the turning controller 19.

The steering angular velocity computation unit 20*ab* is configured to differentiate the steering angle, and to compute the steering angular velocity.

The differential steer control amount computation unit 20*ac* is configured to operate the differential steer control amount that is a control amount depending on the steering angular velocity computed by the steering angular velocity computation unit 20*ab*. The differential steer control amount computation unit 20*ac* is configured to calculate the differential steer control amount by reference to the differential steer map based on the steering angular velocity.

Herein, the differential steer control amount in the reaction force control is set to be a value obtained by multiplying the steering angular velocity by a predefined differential gain K2 (>K1). Herein, the differential gain K2 is set to be larger, as the vehicle speed is higher. Further, the differential steer control amount is set to have an upper limit with a certain limit value, like the differential steer control amount in the turning control.

The addition unit 20*ad* is configured to add the steady steer control amount computed by the steady steer control amount computation unit 20*aa* and the differential steer control amount computed by the differential steer control amount computation unit 20*ac*, and to generate a virtual target turning angle.

The target reaction force generator 20*b* is configured to generate a target steering reaction force by reference to the virtual target turning angle generated by the virtual target turning angle generator 20*a*, the vehicle speed, a vehicle state, and the turning motor currents (the motor current values of the first and second turning motors 9*a* and 9*b*).

Herein, the target steering reaction force Th is calculated by the following expression $$Th = Ih \cdot d2\theta/dt2 + Ch \cdot d\theta/dt + Kh \cdot \theta + Th \cdot (\theta - \theta ac) + Fh \cdot CF + Lh \cdot AP \quad (1)$$

where θ is the virtual target turning angle, dθ/dt is the virtual target turning angular velocity that is a first-order differential value of the virtual target turning angle θ, and d2θ/dt2 is a virtual target turning angular acceleration that is a second-order differential value of the virtual target turning angle θ.

In the above expression, Ih is an inertia coefficient, Ch is a dumping coefficient, Kh is a spring property coefficient, Th is a feedback coefficient, Fh is a tire lateral force coefficient, CF is a tire lateral force, Lh is a turning axial force coefficient, AP is a turning axial force converted from a turning motor current, and θac is an actual turning angle.

Here, the first item on the right side is an inertia item that simulates an inertia component of the steering reaction force generated according to the virtual target turning angular acceleration. The second item is a dumping item that simulates a viscosity component of the steering reaction force generated according to the virtual target turning angular velocity. The third item is a spring item (stiffness item) that simulates a spring component of the steering reaction force generated according to the rotation angle of the steering wheel 1. The fourth item is a feedback item that simulates a feedback component of the steering reaction force generated according to a deviation between the virtual target turning angle and the actual turning angle. The fifth item is a tire lateral force item that simulates a tire lateral force component of the steering reaction force generated according to the tire lateral force. The sixth item is a self-aligning torque item that simulates a self-aligning torque component of the steering reaction force generated according to the self-aligning torque.

In the above-described expression (1), the parameters Ih, Ch, Kh, Th, Fh, and Lh of determining reaction force properties (reaction force properties that control the steering reaction force with respect to the steering operation), are coefficients all depending on the vehicle speed, and are set to be larger values as the vehicle speed is higher. Thus, the travel stability at high-speed travelling is ensured.

The motor drive unit 20c is configured to supply the reaction force motor 5 with the instruction electric current, by which the target electric current that has been generated by the target reaction force generator 20b according to the target steering reaction force, and the actual reaction force (the actual electric current being supplied to the reaction force motor 5 that has been detected by an electric current sensor, not illustrated) match each other.

(Operation)

Figure 4:
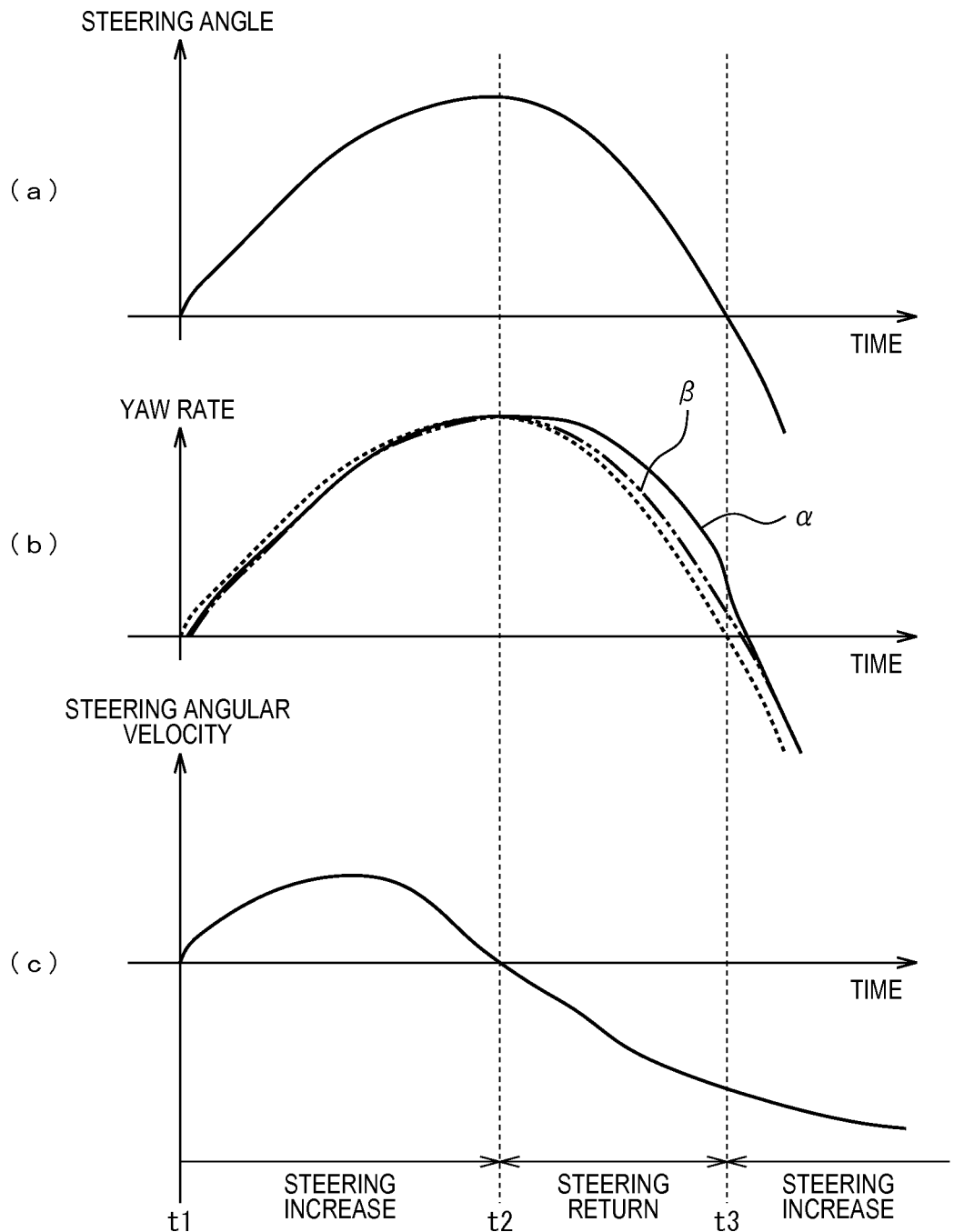
FIG. 4 is a view illustrative of an operation in one embodiment of the present disclosure.

Next, operations in one embodiment of the present disclosure will be described. At time t1 of FIG. 4, it is supposed that a driver starts the vehicle that has been stopped, and the driver increasingly turns the steering wheel 1. Then, the controller 15 calculates the target turning angle based on the steering angle and the vehicle speed (the target turning angle generator 19a). In this situation, the controller 15 refers to the variable gear ratio map to calculate the steady steer control amount (steady item), and in addition, refers to the differential steer map to calculate the differential steer control amount (transient item).

From time t1 to time t2, as illustrated in FIG. 4A and FIG. 4C, as the code of the steering angle and the code of the steering angular velocity are both positive, the controller 15 determines that the driver is increasingly turning the steering wheel 1. Therefore, the differential steer control amount is added to the steady steer control amount without change, and the addition result is set to the target turning angle. Subsequently, the controller 15 calculates the instruction electric current of the turning motor 9 based on the subtraction result obtained by subtracting the actual turning angle from the target turning angle that has been calculated. By driving the turning motor 9 based on the instruction electric current, the turning wheels 2 are turned depending on the driver's steering operation.

Simultaneously, the controller 15 calculates the virtual target turning angle based on the steering angle and the vehicle speed (the virtual target turning angle generator 20a), and generates the target steering reaction force based on the virtual target turning angle that has been calculated, the vehicle speed, the vehicle state, and the turning motor electric current (target reaction force generator 20b). Then, by driving the reaction force motor 5 based on the target steering reaction force that has been generated, the steering reaction force is applied to the steering wheel 1.

Then, when the driver returns the steering wheel 1 at time t2, as the code of the steering angular velocity becomes negative, as illustrated in FIG. 4A and FIG. 4C, the code of the steering angle and the code of the steering angular velocity are different from each other. Then, the controller 15 computes the differential steer control amount that has been corrected by multiplying the correction gain K (for example, 0.4) which is smaller than 1 by the differential steer control amount that has been computed based on the steering angular velocity. Then, the result obtained by adding the differential steer control amount that has been corrected to the steady steer control amount is set to the target turning angle, so that the turning motor 9 is driven and controlled.

Then, when the driver increases the turning of the steering wheel 1 at time t3, as illustrated in FIG. 4A and FIG. 4C, the code of the steering angle and the code of the steering angular velocity are same with each other again. Therefore, the controller 15 adds the differential steer control amount that has been computed based on the steering angular velocity to the steady steer control amount without change, and sets the addition result as the target turning angle to drive-control the turning motor 9.

Thus, while the driver is returning the steering wheel, the differential steer control amount is computed to be smaller than the differential steer control amount in the steering increasing operation. In other words, in a case where the driver is returning the steering wheel, the phase of the turning angle (i.e., vehicle yaw rate) with respect to the steering angle is delayed as compared to a case where the driver is increasingly turning the steering wheel, so that the response performance of the turning output with respect to the steering input is lowered.

The driver makes a steering angle by applying a force to the steering wheel 1 in the steering increasing operation. In this situation, turning without a response delay with respect to the steering input of the driver can be said that it is an ideal steering feeling for the driver. Thus, in order to realize such a target response in the steering increasing operation, it can be considered that in the turning control, the differential steer map is set to generate the target turning angle suitable for the target response in the steering increasing operation. In this case, when the turning responses in the steering returning operation and the steering increasing operation are set equally, the vehicle yaw rate changes as indicated by two-dot chain line β of FIG. 4B. In other words, in the steering returning operation and in the steering increasing operation, the response delay of the vehicle yaw rate with respect to the steering angle is eliminated.

In general, in the SBW system, the phases of the turning angle (i.e., vehicle yaw rate) with respect to the steering angle are almost the same, in the steering increasing operation and in the steering returning operation. In other words, when the phase of the turning angle with respect to the steering angle is advanced in order to realize the target response in the steering increasing operation, the response performance of the turning output with respect to the steering input in the steering returning operation is enhanced similarly to the steering increasing operation.

Then, in general, in the SBW system, it has been considered to achieve quick vehicle behaviors and comfortable steering feelings that the response performance of the turning output with respect to the steering input is set to be high, regardless of the steering increasing operation or the steering returning operation, as described above.

However, it has been understood that ideal steering feelings demanded by drivers are in fact that the response is not delayed in the steering increasing operation, and the vehicle yaw rate and the steering wheel return naturally, when the driver releases his/her force from the steering wheel and returns the steering wheel. In other words, ideal steering feelings demanded by drivers are that the response is not delayed in the steering increasing operation and the response is delayed in the steering returning operation, instead of achieving high turning responses in both of the steering increasing operation and the steering returning operation.

For example, in the EPS (Electric Power Steering), the steering wheel and the turning wheels are mechanically coupled with each other to conduct the steering assist control to apply a steering assist force to the steering system to reduce the steering burden of the driver. In the EPS, the assist force depending on the driver's steering input is generated in the steering increasing operation, whereas the assist force is weakened depending on the tire reaction force in the steering returning operation. In the steering returning operation, the vehicle and the steering wheel return naturally.

What kind of steering feeling is a feeling without an uncomfortable feeling to a driver is that it depends on the driver's past driving experiences. In other words, the driver who has experienced the above-described steering feeling of the EPS tends to feel that it is an ideal steering feeling.

Therefore, when the differential steer is adjusted for the steering increasing operation as described above and the turning responses are set to be high in both of the steering returning operation and the steering increasing operation, the yaw rate return is made too early with respect to the steering angle by an excessive effect of the phase advance in the steering returning operation. As a result, an uncomfortable feeling is given a driver.

Thus, the inventors of the present disclosure have focused on this fact for the first time. In one embodiment of the present disclosure, while a driver is returning the steering wheel in the turning control, the response performance of the turning output with respect to the steering input is made lower than the response performance in the steering increasing operation. To be specific, while the driver is returning the steering wheel, the differential steer control amount is computed to be smaller than the differential steer control amount while the driver is increasingly operating the steering wheel. Accordingly, as indicated by a solid line α of FIG. 4B, in a case where a driver is returning the steering wheel (time t2 to time t3), the turning response can be delayed as compared to a case where the driver is increasingly operating the steering wheel. Thus, the natural yaw rate return to the steering angle can be achieved in the steering returning operation.

In other words, movements of the force control in the EPS can be simulated in the angle control in the SBW. As a result, the steering feeling of the SBW can be closer to the ideal steering feeling of the EPS.

It is to be noted that in FIG. 2, the steady steer control amount computation unit 19aa corresponds to a steady steer control amount computation unit, the differential steer control amount computation unit 19ad and the gain multiplication unit 19ae correspond to a differential steer control amount computation unit, and the addition unit 19af corresponds to a target turning angle setting unit. Herein, the differential steer control amount computation unit 19ad corresponds to a reference value computation unit. In addition, the steering increase/return determination unit 19ac corresponds to a steering returning operation detector.

(Effects)

In the embodiments of the present disclosure, the following effects are obtainable.

(1) The turning controller 19 detects the steering returning operation with the steering wheel 1 operated by the driver. Then, in the case where the steering returning operation by the driver is detected, the turning controller 19 makes the response performance of the turning output with respect to the steering input lower than the response performance in the case where the steering increasing operation by the driver is detected. Thus, in the turning control, the turning response in the steering returning operation can be delayed as compared to the turning response in the steering increasing operation. Accordingly, even if the differential steer is adjusted for the steering increasing operation in order to obtain the turning response without a response delay in the steering increasing operation, an excessive effect of the phase advance is not affected in the steering returning operation. In other words, ideal steering feelings can be achieved such that there is no response delay in the steering increasing operation and the steering wheel 1 naturally returns in the steering returning operation.

(2) The turning controller 19 computes the steady steer control amount that is a control amount depending on the steering angle. In addition, the turning controller 19 computes the differential steer control amount that is a control amount depending on the steering angular velocity. Further, the turning controller 19 adds the steady steer control amount and the differential steer control amount, and sets the addition result as the target turning angle of the turning wheel. Then, in the case where the steering returning operation of the steering wheel 1 by the driver is detected, the turning controller 19 computes the differential steer control amount to be smaller than the differential steer control amount in the case where the steering returning operation is not detected. Thus, in the turning control, the differential steer control amount in the steering returning operation is computed to be smaller than the differential steer control amount in the steering increasing operation. Therefore, the phase of the turning angle (i.e., vehicle yaw rate) with respect to the steering angle can be delayed in the steering returning operation, as compared to the steering increasing operation. Thus, the response performance of the turning output with respect to the steering input in the steering returning operation can be made lower than the response performance in the steering increasing operation, in an appropriate manner.

(3) The turning controller 19 computes the reference value of the differential steer control amount based on the steering angular velocity of the steering wheel 1. Then, the turning controller 19 computes the differential steer control amount by multiplying the reference value of the differential steer control amount by a gain according to a determination result of the steering operation (steering increasing operation/steering returning operation). Thus, in the steering returning operation, a smaller gain than that of the steering increasing operation is multiplied by the reference value of the differential steer control amount, so that the differential steer control amount in the steering returning operation is computed to be smaller than the differential steer control amount in the steering increasing operation. Thus, the turning response in the steering returning operation can be delayed as compared to the turning response in the steering increasing operation, in an appropriate manner.

(4) The turning controller 19 determines that the driver is returning the steering wheel, when the code of the steering angle and the code of the steering angular velocity are different from each other. Accordingly, the steering returning operation of the steering wheel 1 operated by the driver can be detected easily and appropriately. In addition, the steering angle to be used for the computation of the steady steer control amount and the steering angular velocity to be used for the computation of the differential steer control amount are used for detecting the steering returning operation. Therefore, there is no necessity to provide a sensor for detecting the steering returning operation separately.

(5) In the case where the steering returning operation by the driver is detected, the response performance of the turning output with respect to the steering input is made lower than the response performance in the case where the steering increasing operation by the driver is detected. Thus, in the turning control, the turning response in the steering returning operation can be delayed as compared to the turning response in the steering increasing operation. Accordingly, it is possible to achieve an ideal steering feeling such that there is no response delay in the steering increasing operation and the steering wheel 1 naturally returns in the steering returning operation.

Figure 5:
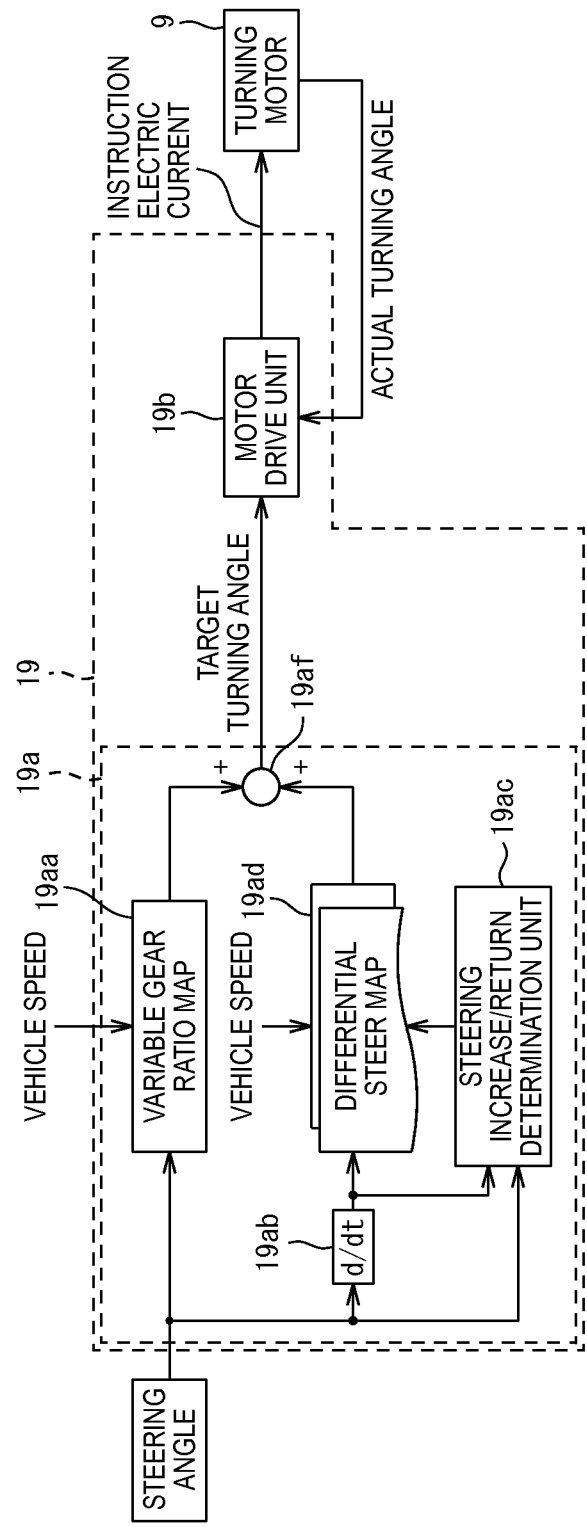
FIG. 5 is a control block diagram illustrative of another example of the turning control.

(Modifications)
(1) In the above-described embodiments, the descriptions have been given to the case where the correction gain K is multiplied by the differential steer control amount that has been computed based on the steering angular velocity. However, the differential steer control amount can be computed by changing the differential steer maps between the steering increasing operation and the steering returning operation. In this case, the control block of the turning control is illustrated in FIG. 5. In other words, the differential steer map to be used by the differential steer control amount computation unit 19ad is changed depending on the determination result of the steering increase/return determination unit 19ac. Accordingly, it is possible to compute the differential steer control amount in the steering returning operation to be smaller than the differential steer control amount in the steering increasing operation in a comparatively simple manner. Thus, the turning response in the steering returning operation can be delayed as compared to the turning response in the steering increasing operation in an appropriate manner, so that an ideal steering feeling can be achieved.
(2) In the above-described embodiments, the descriptions have been given to the case where the steering returning operation of the steering wheel 1 operated by the driver is detected by comparing the code of the steering angle with the code of the steering angular velocity. However, the detection method is not limited to this. For example, another detection method of comparing the code of the vehicle yaw rate with the code of the steering angular velocity, or comparing the code of the lateral G of the vehicle with the code of the steering angular velocity can be used.
(3) In the above-described embodiments, the descriptions have been given of the case where the differential steer control amount is computed according to the steering angular velocity. However, the target turning angles (virtual target turning angles) that have been computed by the steady steer control computation units (19aa and 20aa) can be used for computing the differential steer control amount according to the target turning angular velocity that has been differentiated. Since the target turning angle (virtual target turning angle) is computed based on the steering angle, even if the target turning angular velocity is used instead of the steering angular velocity, an equal result is obtainable.
(4) In the above-described embodiments, the descriptions have been given of the case where the differential steer control amount in the steering returning operation is computed to be smaller than the differential steer control amount in the steering increasing operation. However, as far as the response of the turning output with respect to the steering input in the steering returning operation can be made lower than the response in the steering increasing operation, any technique is selectable appropriately.

According to the vehicle steering control device in the present disclosure, in the turning control, the turning response in the steering returning operation can be delayed as compared to the turning response in the steering increasing operation. Thus, it is possible to achieve an ideal steering feeling such that there is no response delay in the steering increasing operation and the steering wheel naturally returns in the steering returning operation, and it is useful.

The invention claimed is:

1. A vehicle steering control device, comprising:
  a turning controller configured to control turning of a turning wheel at a target turning angle depending on a steering state of a steering wheel, the steering wheel being mechanically separated from the turning wheel; and
  a steering returning operation detector configured to detect a steering returning operation with the steering wheel operated by a driver,
  wherein the turning controller comprises:
  a steady steer control amount computation unit configured to compute a steady steer control amount that is a control amount depending on a steering angle of the steering wheel;
  a differential steer control amount computation unit configured to compute a differential steer control amount that is a control amount depending on a steering angular velocity of the steering wheel; and
  a target turning angle setting unit configured to set as a target turning angle an addition value obtained by adding the steady steer control amount computed by the steady steer control amount computation unit and the differential steer control amount computed by the differential steer control amount computation unit,
  wherein the differential steer control amount computation unit comprises:
  a reference value computation unit configured to compute a reference value of the differential steer control amount based on the steering angular velocity of the steering wheel; and
  a gain multiplication unit configured to compute the differential steer control amount obtained by multiplying the reference value of the differential steer control amount computed by the reference value computation unit by a gain depending on a detection result of the steering returning operation detector, and
  wherein when the steering returning operation detector detects the steering returning operation with the steering wheel operated by the driver, the gain multiplication unit is configured to make the gain smaller than the gain generated when the steering returning operation detector detects the steering increasing operation.

2. The vehicle steering control device according to claim 1, wherein the reference value computation unit is configured to compute the reference value of the differential steer control amount from the steering angular velocity of the steering wheel and a differential steer map in which the steering angular velocity of the steering wheel and the reference value of the differential steer control amount are associated with each other.

3. The vehicle steering control device according to claim 2, wherein the differential steer map is configured to compute the reference value of the differential steer control amount to be larger as a vehicle speed is higher.

4. A vehicle steering control device, comprising:
  a turning controller configured to control turning of a turning wheel at a target turning angle depending on a steering state of a steering wheel, the steering wheel being mechanically separated from the turning wheel; and
  a steering returning operation detector configured to detect a steering returning operation with the steering wheel operated by a driver,
  wherein the turning controller comprises:
  a steady steer control amount computation unit configured to compute a steady steer control amount that is a control amount depending on a steering angle of the steering wheel;
  a differential steer control amount computation unit configured to compute a differential steer control amount that is a control amount depending on a steering angular velocity of the steering wheel; and a target turning angle setting unit configured to set as a target turning angle an addition value obtained by adding the steady steer control amount computed by the steady steer control amount computation unit and the differential steer control amount computed by the differential steer control amount computation unit, wherein the differential steer control amount computation unit is configured to compute the differential steer control amount from the steering angular velocity of the steering wheel and a differential steer map in which the steering angular velocity of the steering wheel and the differential steer control amount are associated with each other, and wherein when the steering returning operation detector detects the steering returning operation with the steering wheel operated by the driver, the differential steer control amount computation unit is configured to compute the differential steer control amount to be smaller, by reference to the differential steer map that is different from another differential steer map when the steering returning operation detector detects the steering increasing operation, than the differential steer control amount generated when the steering returning operation detector detects the steering increasing operation.

5. A vehicle steering control method, comprising:

setting as a target turning angle an addition value obtained by adding a steady steer control amount that is a control amount depending on a steering angle of a steering wheel and a differential steer control amount that is a control amount depending on a steering angular velocity of the steering wheel, the steering wheel being mechanically separated from a turning wheel;

controlling turning of the turning wheel at the target turning angle that has been set;

computing a reference value of the differential steer control amount based on the steering angular velocity of the steering wheel;

computing the differential steer control amount obtained by multiplying the reference value of the differential steer control amount that has been computed by a gain; and when a steering returning operation with the steering wheel operated by a driver is detected, making the gain smaller than the gain generated when a steering increasing operation is detected.

6. A vehicle steering control method, comprising:

setting as a target turning angle an addition value obtained by adding a steady steer control amount that is a control amount depending on a steering angle of a steering wheel and a differential steer control amount that is a control amount depending on a steering angular velocity of the steering wheel, the steering wheel being mechanically separated from a turning wheel;

controlling turning of the turning wheel at the target turning angle that has been set;

computing the differential steer control amount from the steering angular velocity of the steering wheel and a differential steer map in which the steering angular velocity of the steering wheel and the differential steer control amount are associated with each other; and when a steering returning operation with the steering wheel operated by a driver is detected, computing the differential steer control amount to be smaller, by reference to the differential steer map that is different from another differential steer map when a steering increasing operation is detected, than the differential steer control amount when the steering increasing operation is detected.

* * * * *